Aug. 16, 1932.  W. F. BROWN  1,872,399
SHEET GLASS APPARATUS
Filed July 26, 1929
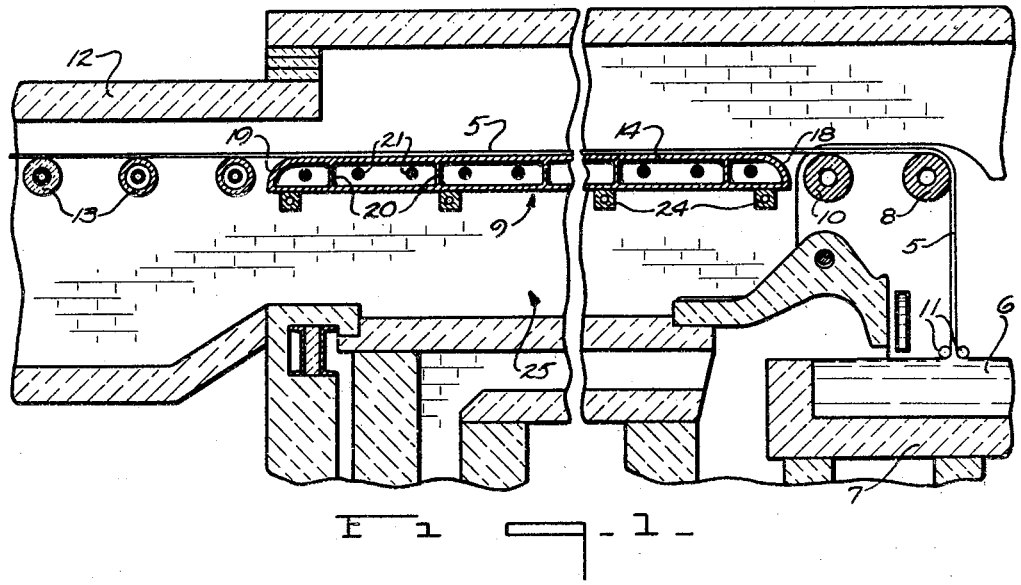
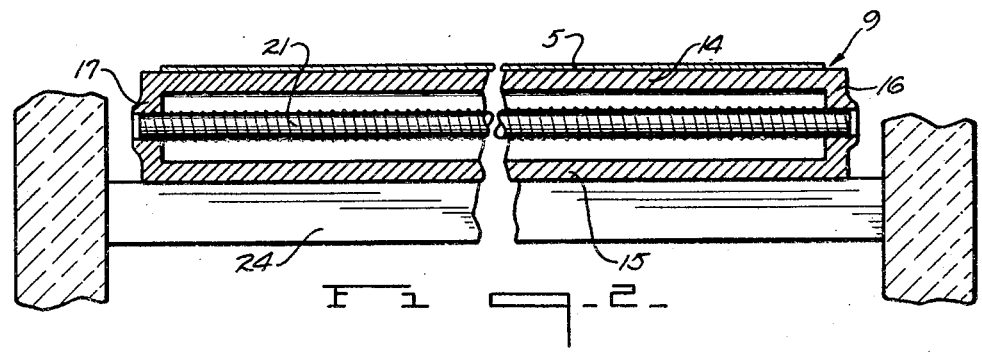
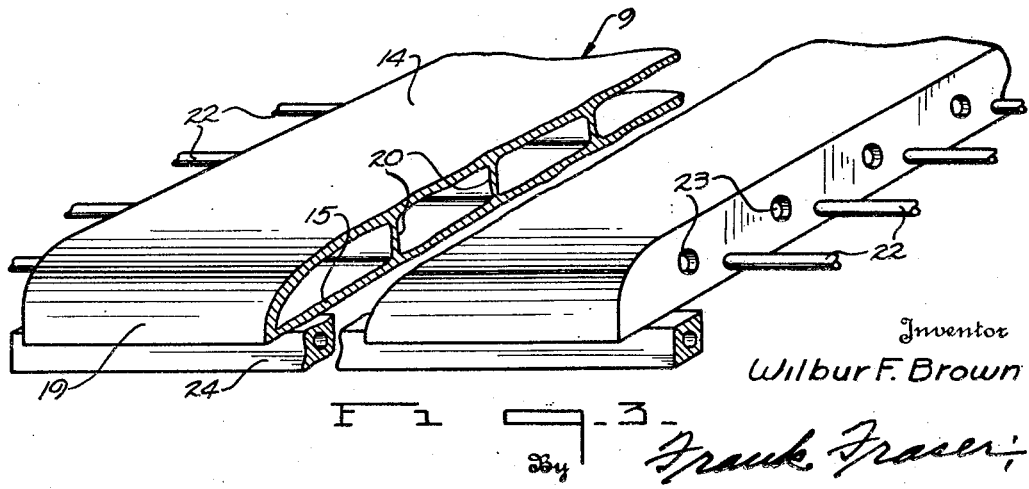
Inventor
Wilbur F. Brown
By Frank Fraser
Attorney Patented Aug. 16, 1932

1,872,399

UNITED STATES PATENT OFFICE

WILBUR F. BROWN, OF TOLEDO, OHIO, ASSIGNOR TO LIBBEY-OWENS-FORD GLASS COMPANY, OF TOLEDO, OHIO, A CORPORATION OF OHIO

SHEET GLASS APPARATUS

Application filed July 26, 1929. Serial No. 381,147.

The present invention relates generally to the manufacture of sheet glass and more particularly to the drawing of glass in continuous or substantially continuous flat sheet form from a molten bath.

Although this invention is not limited to use in connection with any particular type of sheet glass forming apparatus, it may be effectively used in the Colburn system such as is illustrated for example in the Patent to I. W. Colburn, No. 1,248,809, granted Dec. 4, 1917. Briefly stated, in the Colburn system, the glass sheet is drawn initially in a generally vertical direction for a suitable distance and then while still in a semi-plastic condition, although substantially set in its final sheet form, is deflected into the horizontal plane about a rotatable bending member or roll and passed onto and over the upper surface of a so-called draw table into an annealing leer.

The draw table ordinarily employed consists of an endless traveling conveyor which acts as a combined drawing and flattening means for the sheet, the endless conveyor constituting the draw table being usually composed of a plurality of pivotally associated links. With certain types of draw tables of this character, there is a tendency for the newly formed and still somewhat plastic glass sheet supported thereupon to sag between the links thereof which injuriously affects the flatness of the sheet and also causes link marks and scratches upon the surface thereof.

The object of this invention, therefore, is to avoid those objectionable features incident to the use of the customary traveling draw tables by substituting therefor an improved type of stationary table for supporting the glass sheet in its horizontal run and which table is designed to give a flatter sheet than the traveling tables and which, in addition, will not act to scratch or mar the sheet sliding thereover.

Another object of the invention is the provision of a stationary draw table having a flat unbroken sheet supporting surface preferably constructed of a suitable non-corrosive alloy together with means for controlling the temperature thereof.

Other objects and advantages of the invention will become more apparent during the course of the following description when taken in connection with the accompanying drawing.

In the drawing wherein like numerals are employed to designate like parts throughout the same, Fig. 1 is a vertical longitudinal section through a form of sheet glass apparatus illustrating the present invention in use, Fig. 2 is a transverse section through the improved flattening table, and Fig. 3 is a perspective view of a portion of the flattening table partially broken away.

Referring to the drawing, the glass sheet 5 is initially drawn upwardly from a bath of molten glass 6 contained within a suitable receptacle or draw pot 7, the molten glass 6 being supplied to the pot 7 either continuously or substantially continuously from any suitable type of furnace. While in a semi-plastic condition, although substantially set in its final sheet form, the glass sheet 5 is deflected from the vertical plane into the horizontal plane over a rotatable bending member or roll 8, and then passed horizontally onto and over the upper surface of the improved flattening table 9 provided by the present invention. The sheet 5 may be supported between the flattening table 9 and bending roll 8 upon a supporting roll 10 which may or may not be positively driven as desired, and the sheet 5 may be maintained to width by the provision of suitable edge engaging devices 11 positioned to engage opposite edges of said sheet adjacent the molten bath 6. The sheet passes from the flattening table 9 into a horizontally arranged annealing leer 12 wherein it is supported and carried along upon a plurality of leer rolls 13 or other suitable conveying mechanism.

The improved type of flattening table 9 herein provided consists of a horizontal stationary casing or slab including the top and bottom walls 14 and 15 and the side walls 16 and 17, the top wall 14 curving downwardly at its opposite ends to meet the bottom wall 15 as indicated at 18 and 19. The top and bottom walls 14 and 15 are maintained spaced from one another by a plurality of transverse partitions or webs 20 which serve to divide the interior of the casing or slab into a plurality of separate compartments or chambers.

The top 14 of the table is adapted to present a flat unbroken surface upon which the glass sheet 5 may be supported without injury and upon which said sheet will be permitted to settle and flatten so that an extremely flat sheet may be had. In order to prevent the sheet from being scratched or marred as it is slid over the table, the entire table or the top thereof contacting with the sheet is preferably constructed of a suitable non-corrosive alloy such as monel, nichrome, stellite, etc. With the sheet of glass sliding continuously over the table, the upper surface of said table will be kept free of scale.

For the purpose of controlling the temperature of the flattening table 9, different types of temperature control means may be employed. For example, in Fig. 2, the flattening table is adapted to be internally heated by the provision of a plurality of electric heating elements 21 which extend transversely through said table and which are shown as being supported in the opposite side walls 16 and 17 thereof. On the other hand, the heating means used may include a plurality of burners 22 positioned at the sides of the table and adapted to direct the flames issuing therefrom through the openings 23 in the side walls thereof. The temperature of the table could be readily controlled automatically by electrical means. The flattening table 9 is supported upon a plurality of cross members 24 carried by the side walls of the chamber 25 within which said table is located.

As above pointed out, the flattening tables heretofore commonly used have been movable and have aided in drawing the glass sheet upwardly from the molten bath. Inasmuch as the present table is not movable, the drawing pull for the sheet will be supplied by the leer rolls 13 and if desired, the first few leer rolls adjacent to the flattening table could be also made of a non-corrosive alloy so as not to injure the sheet surface. The temperature of these rolls could likewise be automatically controlled by any preferred means. With the use of the present table 9, an extremely flat sheet will be had as the glass will be permitted to settle down upon the table as it is caused to move thereover. Also, since the table presents a flat unbroken surface upon which the glass sheet rests, danger of scratching the sheet or otherwise marking or injuring the same as it is slid over said table will be minimized.

It is to be understood that the form of the invention herewith shown and described is to be taken as the preferred embodiment of the same, and that various changes in the specification, size and arrangement of parts may be resorted to without departing from the spirit of the invention or the scope of the subjoined claims.

I claim:

1. In apparatus for producing sheet glass, a receptacle containing a bath of molten glass, a horizontal rotatable bending member mounted above said receptacle, a rotatable supporting member spaced from and in horizontal alignment with the bending member, an annealing leer, a plurality of horizontally arranged rolls positioned within the leer forwardly of the rotatable supporting member and in horizontal alignment therewith, said rolls being adapted to draw a sheet vertically from the molten bath and deflect the same about the bending member into the horizontal plane, and a stationary horizontal flattening table interposed between said rotatable supporting member and leer rolls for receiving the sheet directly thereupon from the former and from which the sheet passes directly onto the latter.

2. In apparatus for producing sheet glass, a receptacle containing a bath of molten glass, a horizontal rotatable bending member mounted above said receptacle, a rotatable supporting member spaced from and in horizontal alignment with the bending member, an annealing leer, a plurality of horizontally arranged rolls positioned within the leer forwardly of the rotatable supporting member and in horizontal alignment therewith, said rolls being adapted to draw a sheet vertically from the molten bath and deflect the same about the bending member into the horizontal plane, a hollow stationary horizontal flattening table interposed between said rotatable supporting member and leer rolls for receiving the sheet directly thereupon from the former and from which the sheet passes directly onto the latter, and a plurality of electric heating units extending transversely within the flattening table and supported within the opposite side walls thereof.

3. In apparatus for producing sheet glass, a receptacle containing a bath of molten glass, a horizontal rotatable bending member mounted above said receptacle, a rotatable supporting member spaced from and in horizontal alignment with the bending member, an annealing leer, a plurality of horizontally arranged rolls positioned within the leer forwardly of the rotatable supporting member and in horizontal alignment therewith, said rolls being adapted to draw a sheet vertically from the molten bath and deflect the same about the bending member into the horizontal plane, a stationary horizontal flattening table interposed between said rotatable supporting member and leer rolls for receiving the sheet directly thereupon from the former and from which the sheet passes directly onto the latter, and means for heating said flattening table.

Signed at Charleston, in the county of Kanawha and State of West Virginia, this 20th day of July 1929.

WILBUR F. BROWN.